United States Patent [19]

Smith

[11] 4,279,814
[45] Jul. 21, 1981

[54] SALICYL PHENYL NAPHTHYL TRISAZO DI AND TRISULFONIC DEVELOPED DIRECT BLACK DYES

[75] Inventor: Howard L. Smith, Douglassville, Pa.

[73] Assignee: Crompton & Knowles Corporation, New York, N.Y.

[21] Appl. No.: 52,622

[22] Filed: Jun. 27, 1979

[51] Int. Cl.³ .................... C09B 31/22; C09B 33/22; C09B 33/28; D06P 3/32
[52] U.S. Cl. .................................. 260/173; 8/639; 260/147; 260/148; 260/166; 260/207
[58] Field of Search ............... 260/169, 173, 170, 171; 8/23, 639

[56] References Cited

U.S. PATENT DOCUMENTS

| 2,676,957 | 4/1954 | Armento | 260/169 X |
| 2,777,839 | 1/1957 | Bockmann et al. | 260/169 |
| 2,870,136 | 1/1959 | Hanhart | 260/173 |
| 3,325,467 | 6/1967 | Jirou et al. | 260/173 X |

OTHER PUBLICATIONS

Colour Index, Third Edition, vol. 4, pp. 4301 to 4302, #'s 31785, 31790, 31793, (1971).

*Primary Examiner*—Floyd D. Higel
*Attorney, Agent, or Firm*—William H. Elliott, Jr.

[57] ABSTRACT

New trisazo compounds that are useful as developed direct black dyes for cellulosic textiles and as self-shade dyes for paper and leather having the structure:

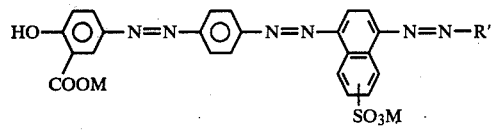

wherein R' is at least one of the following groups:

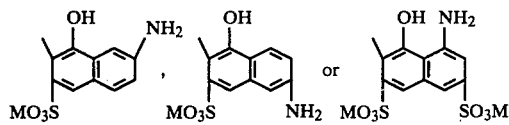

and M is H, Na, K, Li, N(R)₃H where R is H, lower alkyl or lower hydroxyalkyl and each of the R groups can be the same or different.

11 Claims, No Drawings

SALICYL PHENYL NAPHTHYL TRISAZO DI AND TRISULFONIC DEVELOPED DIRECT BLACK DYES

This invention relates to a new group of compounds that are useful as developed direct black dyes for cellulosic textiles and as self-shade dyes for paper and leather; to impart a black coloration thereto. The new dyes are intended to replace widely used dyes such as C.I. Direct Black 38 and C.I. Direct Blue 2—dyes synthesized from an intermediate (benzidine) whose use is being curtailed as a known carcinogen.

The compounds of this invention are water-soluble trisazo compounds having the structure:

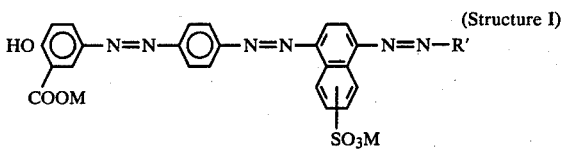
(Structure I)

wherein R' is at least one of the following groups:

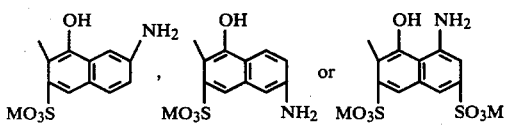

and M is H, Na, K, Li, N(R)$_3$H where R is H, lower alkyl or lower hydroxyalkyl and each of the R groups can be the same or different.

The compounds are made by conventional sequential diazotization and coupling reactions and use available intermediates that have not heretofore been coupled in the particular sequences required to form the Structure I compounds. Thus they are made by diazotizing 5[(4-aminophenyl)azo]-2-hydroxybenzoic acid or a water soluble salt thereof said azo intermediate having the structure:

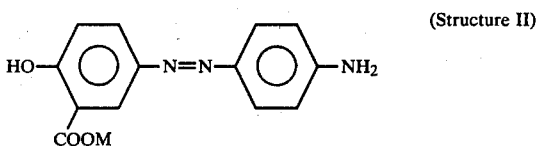
(Structure II)

(wherein M has the same meaning as in Structure I above; hereinafter this intermediate is sometimes referred to as aminoazo salicylic acid) and coupling to a naphthylamine monosulfonic acid using conventional mono-coupling techniques; rediazotizing the resulting disazo compound and coupling to Gamma acid, H acid or J acid or to a mixture of at least two thereof.

Aminoazo salicylic acid is commercially available as a dye intermediate. It is prepared by diazotizing p-nitroaniline, coupling to salicylic acid followed by reduction with sodium sulfide; all in a conventional manner.

For economic reasons, Cleves 1,6 acid is the preferred naphthylamine sulfonic acid; however, Cleves 1,7- acid or mixed Cleves 1,6- and 1,7- acids may also be used.

The Structure I compounds are usually made as sodium sulfonate salts; but as is well known in the art, they can also be made as free acids or as the potassium, lithium, or —N(R)$_3$H wherein R represents the same substituent or different substituents selected from the following: —H, —CH$_3$, —C$_2$H$_5$, —C$_3$H$_7$, —CH$_2$CH$_2$OH, —CH$_2$CH(OH)CH$_3$ or —CH$_2$CH$_2$OCH$_2$CH$_2$OH.

The Structure I compounds are especially useful as developed direct dyes for cellulosic textiles such as cotton or rayon. They can also be used as paper and leather dyes. They possess outstanding water solubility, and as developed dyes, they exhibit excellent build. Desirable shade characteristics are obtained both as self-shade and developed dyes. Moreover, and as previously noted, the Structure I compounds are not synthesized from benzidine. In general, the wet fastness properties of dyeings made with Structure I compounds developed on cellulosic textiles are comparable to those obtained by the use of C.I. Direct Blue 2 as a developed dye.

The Structure I compounds will give black to green self shades to paper and leather and also when applied to cellulosic fibers such as cotton or rayon from aqueous dyebaths. The wash and wet fastness of the dyeings can be greatly enhanced if "developed" by conventional development techniques. To do so the Structure I dye on the dyed fabric is rediazotized in situ and coupled to suitable coupler components to form tetrazo compounds of the structure:

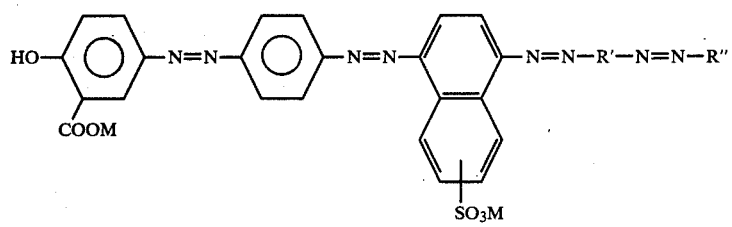

wherein M and R' have the same meanings as heretofore given and R" is the residue of a suitable coupler—preferably an aromatic amine or a phenolic compound that will reduce the water solubility of the resulting tetrazo compound. Suitable couplers are well known and include: 4-methyl-1,3-benzenediamine; 2-naphthol; 1,3-diaminobenzene; 1-phenyl-3-methyl-5-pyrazolone, etc.

The wash and wet fastness of dyeings made with the Structure I compounds can also be enhanced by metallization. For example, by after treating the dyeing with an aqueous solution containing a polyvalent metal ion, such as cupric ion, that can form a complex by linking with the salicylic moiety.

The Structure I compounds can be made as monomolecular structures by coupling to Gamma acid or to J acid or to H acid; the couplings to Gamma acid giving a reddish-black; the couplings to J acid giving generally a bluer cast and the couplings to H acid are greener—all as compared to the self shades of C.I. Direct Blue 2. For reasons of economy, and because the developed hue is very close to that of developed C.I. Direct Blue 2, the couplings to Gamma acid are preferred as monomolecular Structure I compounds.

Further, desirable benefits are obtained if the monomolecular Structure I compounds are used in admixture and in widely varying quantities to provide specific desired hue characteristics; alternatively, the mixtures can be produced by physically admixing the individual compounds or by coupling a mixture of the individual coupling components. The mixture of Gamma and J acid are especially desirable from the standpoint of exhibiting outstanding build up properties and enhanced wash fastness.

Mixtures containing the Structure I couplings to Gamma acid and either H acid or J acid, where the mol % ratio of the Gamma: the H or J compound is about 70:30 give very desirable black hues. The Gamma-J mixture when developed with 4-methyl-1,3-benzenediamine, closely approximates the hue, build up and fastness properties of C.I. Direct Blue 2 as a developed color.

The following examples will serve to illustrate the preparation and use of the Structure I compounds. In these examples, unless otherwise indicated, parts are by weight, temperatures are given in degrees Centigrade and percentages are by weight.

EXAMPLE 1

161 parts of 32% 5-[(4-aminophenyl)azo]-2-hydroxybenzoic acid are diazotized in a conventional manner at 25° C. with hydrochloric acid and sodium nitrite. After stirring at 25° C. for two hours in the presence of nitrous acid, sulfamic acid is added to consume the nitrous acid. The resulting diazo is clarified and added to a mixture of 42.3 parts of Cleves 1,6 acid (m.w. 223) 100 parts of water, 79 parts of sodium carbonate and ice at 5° C. and pH 9. The mixture is stirred approximately one hour and filtered off. The 382 parts of wet filter cake which is recovered, is diazotized in 1100 parts of water and 35 parts of hydrochloric acid by adding 48 parts of 30% sodium nitrite during two hours at 25° C. The mixture is stirred with nitrous acid present overnight at 25° C. Sulfamic acid is added to consume the nitrous acid and the diazo is added to a mixture of 43.2 parts of 2-amino-8-napthol-6-sulfonic acid, 150 parts of water, 16 parts of sodium carbonate and ice at 5° C. and a pH of 8.5. The resulting dye is precipitated with sodium chloride. The dried dyestuff is obtained as a black powder which dyes cotton in reddish black shades. When developed by treating the dyed fabric sequentially with dilute nitrous acid and 4-methyl-1,3-benzenediamine or 1,3-diaminobenzene, greenish black dyeings are obtained which have good wash fastness.

EXAMPLE 2

467 parts of wet filtercake, obtained from coupling 5-[(4-aminophenyl)azo]-2-hydroxybenzoic acid diazo to Cleves 1,6 acid as described in Example 1 are diazotized as in Example 1 and coupled to a mixture of 15 parts of 2-amino-8-naphthol-6-sulfonic acid (m.w. 239), 6.5 parts of 2-amino-5-naphthol-7-sulfonic acid, 100 parts of water, sodium carbonate to maintain the pH at 8–8.5, and ice to maintain the temperature at 5°–10° C. The majority of the dye was precipitated with sodium chloride. The dried dyestuff is obtained as a black powder which dyes cotton in reddish-black shades. When developed by treating the dyed fabric sequentially with dilute nitrous acid and 1,3-diaminobenzene, black dyeings are obtained which have good wash fastness.

EXAMPLE 3

A dye beaker containing 200 ml of water, 2 ml of a 5% solution of a wetting agent (sodium N-methyl-n-oleyl taurate) and 20 ml of 20% sodium chloride is placed into a heatable water bath. 32.3 ml of a stock solution, prepared by dissolving 1 gram of the dry dye obtained in Example 2 in 500 ml of water is added and the total volume is adjusted to 200 ml with water. 10 grams of cotton fabric is immersed and kept continuously moving as the mixture is brought to the boil and kept at the boil for 60 minutes. The dyed fabric is removed from the dye bath, rinsed with a 2% common salt solution, then rinsed with cold water. The dyed fabric is diazotized by immersing in a mixture of 30 ml of a 1% sodium nitrite solution and 50 ml of a 1% solution of sulfuric acid at 70° F. The dyed fabric is continuously moved in this mixture for 20 minutes then removed and rinsed in cold water. The diazotized dye on the fabric is then immersed in 15 ml of a solution composed of 5 grams of 4-methyl-1,3-benzenediamine, 2.5 grams of sodium carbonate and 50 ml water. The diazotized dyed fabric is kept moving in this solution for 20 minutes at 70° F., removed, rinsed in clear water, extracted and dried at 110° F. Greenish-black dyeings which have good wash fastness are obtained. Heavier dyeings are obtained by increasing the amount of dye proportionally (e.g. 97.5 ml of the original stock solution will produce 3% dyeing).

EXAMPLE 4

Example 3 was repeated except that 42.5 ml of a stock dye solution prepared by dissolving 1 gram of the dye from Example 1 in 500 ml water was used instead of the dye from Example 2. The resulting dyeing is a greener black than that obtained in Example 3 and with good washfastness.

The Structure I compounds are less sensitive to hue changes with pH changes than C.I. Direct Black 38.

In mixes where the mol % ratio of the Gamma acid component to the J acid component is 50:50, the resulting hue is much bluer than in the 70:30 mixture.

Even though the Structure I couplings to H acid alone give greenish self shades, when they are admixed with a Structure I coupling to Gamma acid, the mix gives a desirable black self shade.

I claim:

1. A compound having the structure:

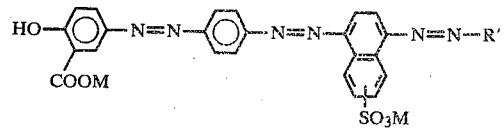

wherein R' is

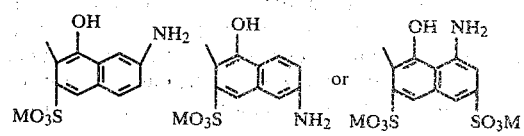

and where M is —H, —Na, —K, —Li or —N(R)₃H and R represents the same or different substituents selected from the group —H, lower alkyl or lower hydroxyalkyl.

2. A compound according to claim 1 wherein R' is:

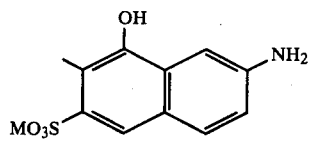

3. A compound according to claim 1 wherein R' is:

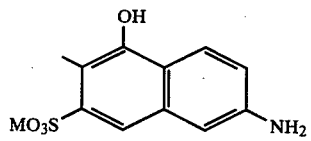

4. A compound according to claim 1 wherein R' is:

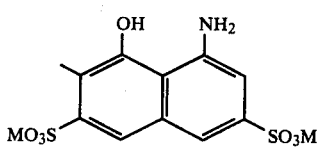

5. A composition comprising and admixture of a Gamma acid compound of claim 2 together with a J acid compound having the structure:

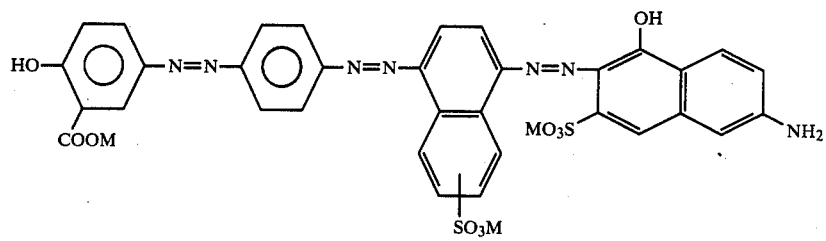

wherein M is —H, —Na, —K, —Li or —N(R)₃H and R represents the same or different substituents selected from the group —H, lower alkyl or lower hydroxyalkyl.

6. A composition according to claim 5 wherein the mol % ratio of the Gamma acid compound to the J acid compound present in the mixture is about 70:30.

7. A composition comprising an admixture of a Gamma acid compound of claim 2 together with a H acid compound having the structure:

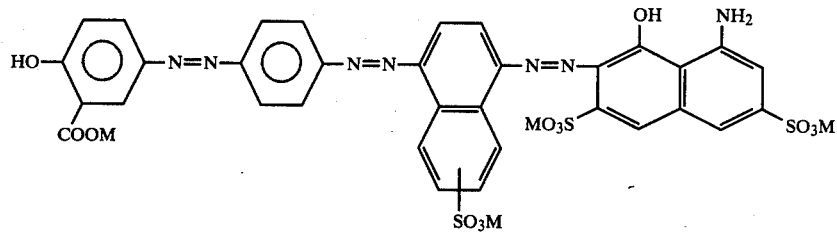

wherein M is —H, —Na, —K, —Li or —N(R)₃H and R represents the same or different substituents selected from the group —H, lower alkyl or lower hydroxyalkyl.

8. A composition according to claim 7 wherein the mol % ratio of the Gamma acid compound to the H acid compound present in the mixture is about 70:30.

9. A composition comprising an admixture of a J acid compound of claim 3 together with a H acid compound having the structure:

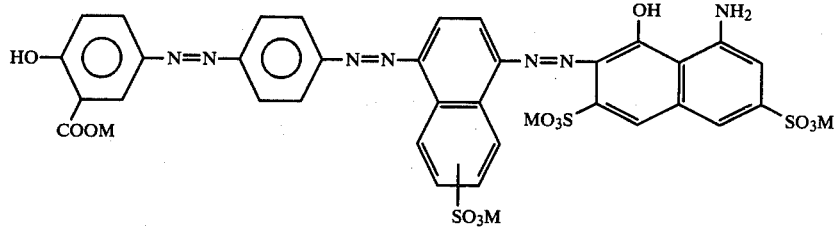

wherein M is —H, —Na, —K, —Li or —N(R)₃H and R represents the same or different substituents selected from the group —H, lower alkyl or lower hydroxyalkyl.

10. A compound according to any one of claims 1 to 9 inclusive where M is Na.

11. A compound according to any one of claims 1 to 9 inclusive wherein the sulfonic group is in the 6-position of the naphthyl moiety.

* * * * *